SYSTEM FOR DETECTING INTRUDERS

Filed June 30, 1964 2 Sheets-Sheet 1

INVENTOR
ANDREW M. ARCHER
BY
ATTORNEY

Oct. 11, 1966 A. M. ARCHER 3,278,923

SYSTEM FOR DETECTING INTRUDERS

Filed June 30, 1964 2 Sheets-Sheet 2

INVENTOR
ANDREW M. ARCHER
BY Ernst A. Jensen
ATTORNEY

United States Patent Office 3,278,923
Patented Oct. 11, 1966

3,278,923
SYSTEM FOR DETECTING INTRUDERS
Andrew M. Archer, New York, N.Y., assignor to Specialties Development Corporation, Belleville, N.J., a corporation of New Jersey
Filed June 30, 1964, Ser. No. 379,104
4 Claims. (Cl. 340—258)

The present invention relates to photoelectric intruder detecting systems, and, more particularly, to such a system which is an improvement over the system disclosed in my copending United States patent application Serial No. 378,129, filed June 26, 1964 for intruder detecting system.

The aforementioned system generally comprises an electrical element such as a photocell which is responsive to light to change electrical values thereof and has a surface exposed to ambient light, reactance means such as a capacitor or an inductance coil, and a mechanically controlled arrangement for alternately exposing two portions of the surface of the element to an equal higher and lower light intensity and for alternately charging opposite sides of the reactance means with current of opposite polarities upon alternate exposure of the two surface portions, whereby the reactance means produces an output upon being charged unequally at opposite sides in sequence which controls an alarm network.

Accordingly, an object of the present invention is to provide an improved intruder detecting system of the foregoing type which does not require any moving parts for effecting current reversal and alternately exposing the surface portions of the photocells to light or other radiations of a higher and lower intensity.

Another object is to provide such a system which operates on A.C.

Another object is to provide such a system which utilizes a minimum of miniature electrical components and is extremely small and compact in arrangement to facilitate concealed installation thereof.

A further object is to provide such a system which is economical to manufacture, assemble and install.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a system which comprises an electrical element responsive to light and/or other radiations to change electrical values thereof and having a surface exposed to ambient light, a partition dividing the surface into two isolated portions, first and second lamps or radiation generating devices at the respective sides of the partition for exposing the surface portions to radiations from the lamps or the devices, a source of A.C., reactance means connected in series with the element across the A.C. source, a first diode connected in series with the first lamp or device across the A.C. source and arranged to conduct in one direction of current flow, a second diode connected in series with the second lamp or device across the A.C. source and arranged to conduct in the opposite direction of current flow whereby the lamps or devices are alternately energized to alternately expose the surface portions to an equal higher and lower radiation intensity, the reactance means having an output upon being charged unequally at opposite sides in sequence, and an alarm control network responsive to the output of the reactance means.

A preferred embodiment of the invention has been chosen for purposes of illustration and description, and is shown in the accompanying drawings, forming a part of the specification, wherein.

Figure 1:
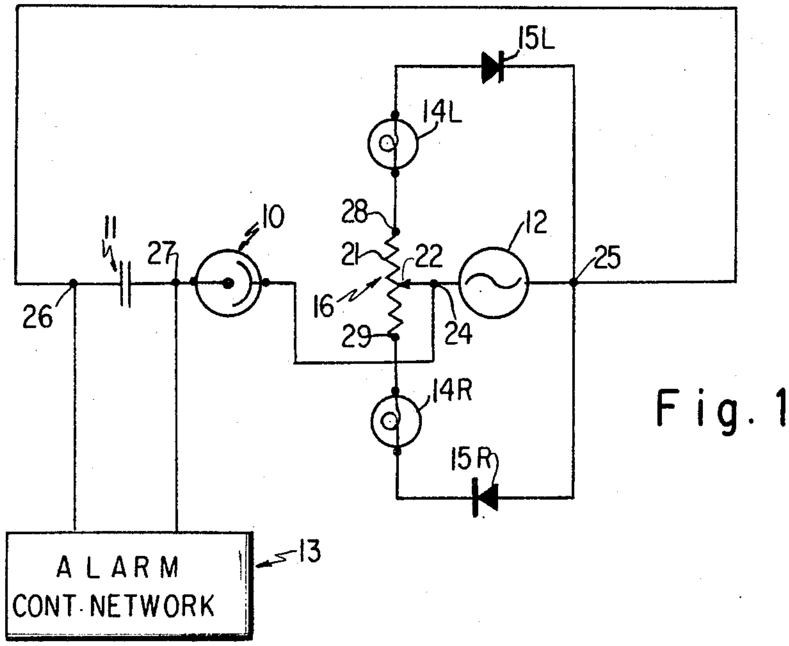
FIG. 1 is a circuit diagram of a network in accordance with the present invention.

Referring to FIG. 1 of the drawing in detail, there is shown an intruder detecting system in accordance with the present invention which comprises a photocell 10, a capacitor 11, a source of A.C. power 12, a pair of lamps 14L and 14R, a pair of diodes 15L and 15R, a potentiometer 16 and an alarm network 13.

Figure 3:
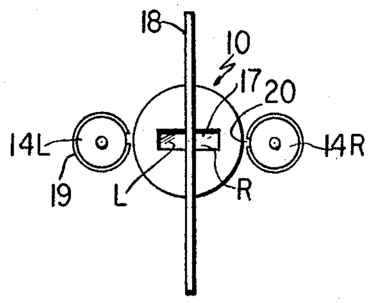
FIG. 3 is a front elevational view of the components shown in FIG. 2.
Figure 2:
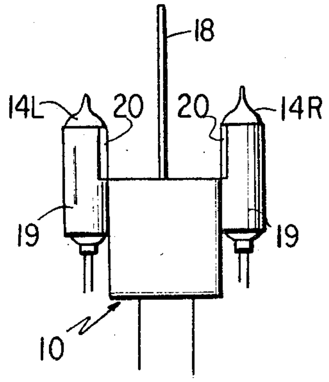
FIG. 2 is a top plan view illustrating the physical relationship of a photocell, two lamps and a partition between the lamps.

As shown in FIGS. 2 and 3, the cell 10 has a window 17 which is exposed to ambient light and is divided into left and right isolated surface portions L and R by an opaque partition 18 extending vertically outwardly of and across the window at the middle thereof. The lamps 14L and 14R are mounted diametrically opposite and adjacent the left and right sides of the cell, respectively; and have a shield 19 thereon formed with a window 20 for directing the light of the lamps on the window portions L and R, respectively.

The lamps 14L and 14R may be miniature incandescent or neon lamps or equivalent means for generatiing other radiations such as heat or a magnetic field to which the cell 10 responds. In the illustrative embodiment, neon lamps are utilized.

The cell 10 used herein is of the cadmium sulfide type which changes in resistance in response to changes in ambient light intensity. If desired, other light sensitive cells or devices may be utilized.

The potentiometer 16 includes a resistor 21 and an adjustable voltage dividing contact 22 connected to one terminal 24 of the A.C. source 12. The cell 10 and the capacitor 11 are connected in series across the terminals 24 and 25 of the A.C. source, and the alarm control network 13 is connected across the terminals 26 and 27 of the capacitor.

The lamp 14L and the diode 15L are connected in series between one terminal 28 of the resistor 21 and the A.C. source terminal 25; and the lamp 14R and the diode 15R are connected in series between the other terminal 29 of the resistor. The diodes are so arranged that one conducts on one half cycle of A.C. and that the other conducts on the other half cycle of A.C. to alternately energize the lamps 14L and 14R.

In operation, when the diode 15L conducts, the lamp 14L is illuminated and light is directed onto the cell window portion L and for that half cycle current flows through the cell 10 from right to left to charge the capacitor 11 at the terminal 27 side thereof. When diode 15R conducts, the lamp 14R is illuminated and light is directed onto the cell window portion R and for that half cycle current flows through the cell from left to right to charge the capacitor at the terminal 26 side thereof.

When there is no intruder in the area viewed by the window of the cell, the cell window portions L and R are alternately exposed to light of equal intensity and the capacitor will be charged alternately equally at opposite sides thereof and has no output.

However, when there is an intruder in the area, a window portion on one side of the partition sees the image and the intensity of the ambient light viewed by that window portion changes when its lamp is unilluminated, whereupon the capacitor is charged unequally at opposite sides thereof in sequence and the difference in charge produces an output capable of operating the alarm control network.

Figure 4:
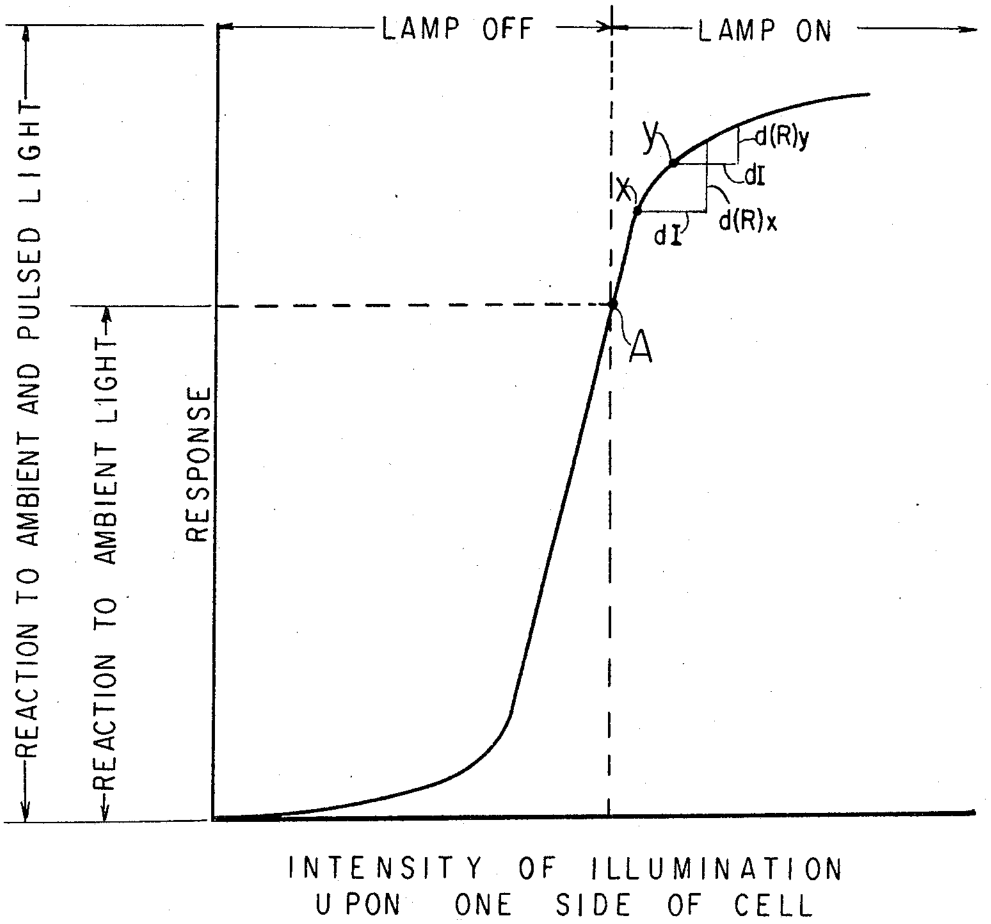
FIG. 4 is a graph illustrating the response curve of the photocell in relation to the illumination of the cell.

The functioning of the system is best explained with reference to FIG. 4 wherein a graph is shon which illustrates the response curve of the cell 10 at various levels of intensity of illumination on the window portion, for example, on the portion L. This curve has a linear portion in the middle and has curved or non-linear portions at its upper and lower ends. The intensity of the ambient light when the lamp 14L is off is such that the response is on the linear portion of the curve as indicated by the point A. When the lamp 14L is illuminated, the response is at a point X on a higher portion of the curve. Since both window portions are alternately subjected to the same intensity of illumination in the absence of the image of an intruder, the left portion L response $(R)_L$ will be equal to the right portion R response $(R)_R$ whereby there is no change in response between successive one half cycles of the cell and $$d(R)_L = d(R)_R, \text{ and } \frac{d(R)_L}{dI_R} = \frac{d(R)_R}{dI_R}$$

However, assuming that the right window portion R sees the image of an intruder, a different amount of light will fall on the cell during that half cycle because of the intruder, and the intensity of the light will cause the cell to respond at a different portion of the curve as indicated by the point $y$, whereby (at $x$)

$$\frac{d(R)_L}{dI_L} \neq \frac{d(R)_R}{dI_R} (\text{at } y)$$

and due to the change in response rate the capacitor will be charged unequally at opposite sides in sequence to produce an alarm actuating signal.

From the foregoing description it will be seen, that the present invention provides an improved single cell intruder detecting system which completely eliminates moving parts.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. An intruder detection system comprising an electrical element responsive to light and other radiations to change electrical values thereof and having a surface exposed to ambient light, a partition dividing said surface into two isolated portions, first and second radiations generating devices at the respective sides of said partition for exposing said surface portions to radiations from said devices, a source of A.C., reactance means connected in series with said element across said A.C. source, a first diode connected in series with said first device across said A.C. source, and arranged to conduct in one direction of current flow, a second diode connected in series with said second device across said A.C. source and arranged to conduct in the opposite direction of current flow whereby said devices are alternately energized to alternately expose said surface portions to an equal higher and lower radiation intensity, said reactance means having an output upon being charged unequally at opposite sides in sequence due to presence of an intruder, and means connected across said reactance means responsive to the output of said reactance means for rendering an alarm.

2. An intruder detection system comprising an electrical element responsive to light to change electrical values thereof and having a surface exposed to ambient light, a partition dividing said surface into two isolated portions, first and second lamps at the respective sides of said partition for exposing said surface portions to light from said lamps, a source of A.C., reactance means connected in series with said element across said A.C. source, a first diode connected in series with said first lamp across said A.C. source, and arranged to conduct in one direction of current flow, a second diode connected in series with said second lamp across said A.C. source and arranged to conduct in the opposite direction of current flow whereby said lamps are alternately illuminated to alternately expose said surface portions to an equal higher and lower light intensity, said reactance means having an output upon being charged unequally at opposite sides in sequence due to the presence of an intruder, and means connected across said reactance means responsive to the output of said reactance means for rendering an alarm.

3. A system according to claim 2, including a potentiometer connected between said lamps and to one side of said A.C. source for balancing the light intensity of said lamps.

4. A system according to claim 2, wherein said lamps are minatures having a window for directing light into said surface portions.

No references cited.

NEIL C. READ, *Primary Examiner.*

R. GOLDMAN, *Assistant Examiner.*